(12) United States Patent
Ribiere-Tharaud et al.

(10) Patent No.: US 9,462,798 B2
(45) Date of Patent: Oct. 11, 2016

(54) HORNET TRAP

(71) Applicant: Commissariat à l'énergie atomique et aux énergies alternatives, Paris (FR)

(72) Inventors: Nicolas Ribiere-Tharaud, Cavagnac (FR); Michel Bourzeix, Malemort sur Corrèze (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 25 days.

(21) Appl. No.: 14/431,921

(22) PCT Filed: Oct. 3, 2013

(86) PCT No.: PCT/EP2013/070643
§ 371 (c)(1),
(2) Date: Mar. 27, 2015

(87) PCT Pub. No.: WO2014/053604
PCT Pub. Date: Apr. 10, 2014

(65) Prior Publication Data
US 2015/0237844 A1  Aug. 27, 2015

(30) Foreign Application Priority Data

Oct. 4, 2012  (FR) ...................................... 12 59436

(51) Int. Cl.
*A01M 1/02* (2006.01)
*A01M 1/22* (2006.01)
(Continued)

(52) U.S. Cl.
CPC ............... *A01M 1/226* (2013.01); *A01M 1/02* (2013.01); *A01M 1/023* (2013.01); *A01M 1/026* (2013.01); *A01M 1/04* (2013.01); *A01M 1/106* (2013.01)

(58) Field of Classification Search
CPC ......... A01M 2200/012; A01M 1/026; A01M 1/226
USPC .......................................................... 43/107
See application file for complete search history.

(56) References Cited

U.S. PATENT DOCUMENTS 4,551,941 A * 11/1985 Schneidmiller ......... A01M 1/04
 43/107
5,241,778 A *  9/1993 Price ..................... A01M 1/023
 43/112

(Continued)

FOREIGN PATENT DOCUMENTS

| CN | 102 177 878 A | 9/2011 |
|---|---|---|
| DE | 20 2004 001 285 U1 | 8/2004 |
| JP | 2003-339291 A | 12/2003 |

OTHER PUBLICATIONS

International Search Report issued in Application No. PCT/EP2013/070643 dated Jan. 30, 2014.

(Continued)

*Primary Examiner* — Shin Kim
(74) *Attorney, Agent, or Firm* — Pearne & Gordon LLP

(57) ABSTRACT

The invention relates to a hornet trap, characterised in that it comprises: a metal chamber (1) that defines a cavity (2), a wall of the chamber being provided with opening means (3) through which at least one hornet can enter the cavity, the opening means (3) being sized such that electromagnetic waves with a given frequency present in the cavity cannot escape from the cavity (2), means (4, 5, 6) of detecting the presence of at least one hornet in the cavity (2), and an electromagnetic wave source (S) capable of generating electromagnetic waves at the given frequency inside the cavity (2) when a hornet is detected in the cavity a call means (A).

9 Claims, 2 Drawing Sheets

(51) Int. Cl.
*A01M 1/04* (2006.01)
*A01M 1/10* (2006.01)

(56) References Cited

U.S. PATENT DOCUMENTS

| | | | | |
|---|---|---|---|---|
| 5,343,652 | A * | 9/1994 | Johnson | A01M 1/02 43/132.1 |
| 5,513,465 | A * | 5/1996 | Demarest | A01M 1/145 43/113 |
| 7,071,829 | B2 * | 7/2006 | Gardner, Jr. | A01M 1/026 250/221 |
| 7,785,541 | B1 * | 8/2010 | Fiorello | A01M 1/2038 222/61 |
| 2014/0250767 | A1 * | 9/2014 | Heugle | A01M 1/026 43/129 |
| 2014/0311014 | A1 * | 10/2014 | Feugier | A01M 1/226 43/107 |
| 2015/0040445 | A1 * | 2/2015 | Li | G09F 7/18 40/606.01 |
| 2015/0237844 | A1 * | 8/2015 | Ribiere-Tharaud | A01M 1/02 43/107 |

OTHER PUBLICATIONS

Written Opinion issued in Application No. PCT/EP2013/070643 dated Jan. 30, 2014.
French Search Report issued in Application No. FR 12 59436 dated Jun. 13, 2013.

* cited by examiner

HORNET TRAP

TECHNICAL FIELD AND PRIOR ART

The invention relates to a hornet trap and more particularly a trap for Asian hornets.

The invention is applicable to the field of eradication of pests harmful to biodiversity, and in the long term to human health.

The Asian hornet is currently growing quickly in terms of the numbers and of geographic distribution. Asian hornets are not considered as pests in Asia because there are many natural predators for these insects. This is not the case on the European continent where their eradication is therefore necessary.

At the present time, the technique used for elimination of Asian hornets consists of injecting an anaesthetic product into hornet nests and then when the insects have been anesthetised, to collect the nests and destroy them by incineration.

This technique is complicated to apply, it is polluting and there is a risk for the persons doing the work. It is also possible that insects belonging to the nest will escape this destruction process and thus contribute to expansion of the species.

The invention does not have these disadvantages.

PRESENTATION OF THE INVENTION

The invention applies to a hornet trap that comprises:
a metal chamber that defines a cavity, a wall of the chamber being provided with opening means through which at least one hornet can enter the cavity, the opening means being sized such that electromagnetic waves with a given frequency present in the cavity cannot escape from the cavity,
means of detecting the presence of at least one hornet in the cavity, and
an electromagnetic wave source capable of generating electromagnetic waves at the given frequency inside the cavity when a hornet is detected in the cavity.

According to another characteristic of the invention, the opening means are composed of a network of honeycomb type waveguides forming all or part of a wall of the chamber.

According to another characteristic of the invention, the cavity contains call means capable of attracting hornets into the cavity. The call means comprise an intense light source and/or a sound source and/or chemical /or biological bait. In one particular embodiment of the invention, the call means are Asian hornet call means.

According to yet another characteristic of the invention, the means capable of detecting the presence of at least one hornet in the cavity comprise optical means that create a strip of light in the cavity and electronic means that output a control signal capable of triggering the electromagnetic wave source as soon as a hornet passes through the light strip.

According to yet another characteristic of the invention, the given frequency is approximately equal to 2.45 GHz.

According to yet another characteristic of the invention, the electromagnetic wave source is a magnetron.

BRIEF DESCRIPTION OF THE FIGURES

Other characteristics and advantages of the invention will become clear after reading the following description with reference to the appended figures among which.

The same references in all the figures denote the same elements.

DETAILED PRESENTATION OF A PARTICULAR EMBODIMENT OF THE INVENTION

Figure 1:
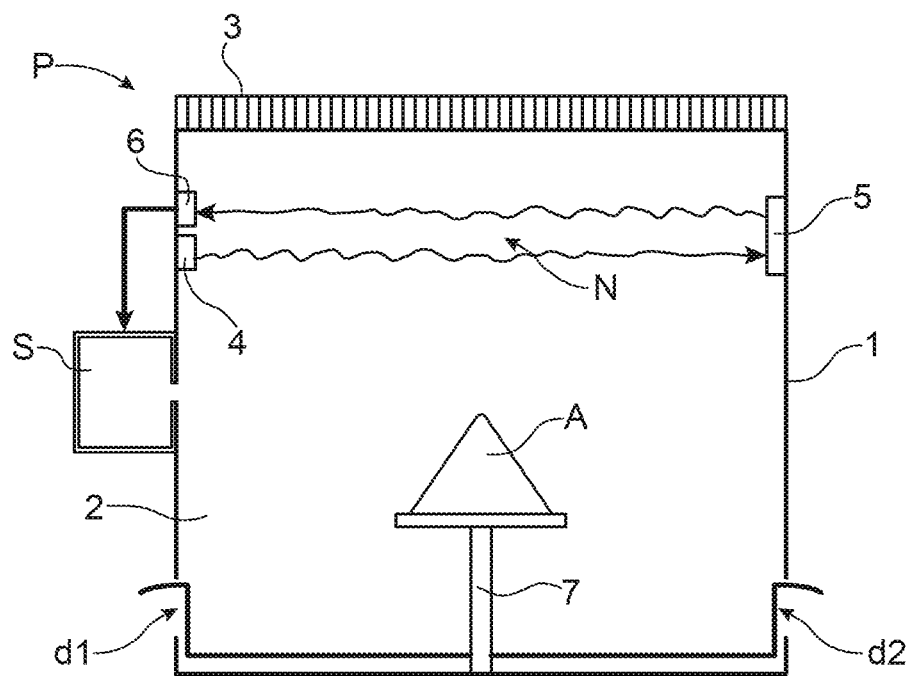
FIG. 1 shows a microwave trap for hornets according to the preferred embodiment of the invention.

FIG. 1 shows a microwave trap for hornets according to the preferred embodiment of the invention.

The microwave trap P comprises the following essential means:
a metallic chamber 1 that defines a cavity 2 that is preferably parallelepiped in shape, one wall of the chamber being provided with means 3 of introducing hornets into the cavity,
means capable of detecting the presence of at least one hornet in the cavity, and
an electromagnetic wave source S capable of generating electromagnetic waves inside the cavity as soon as a hornet is detected in the cavity.

Figure 2:
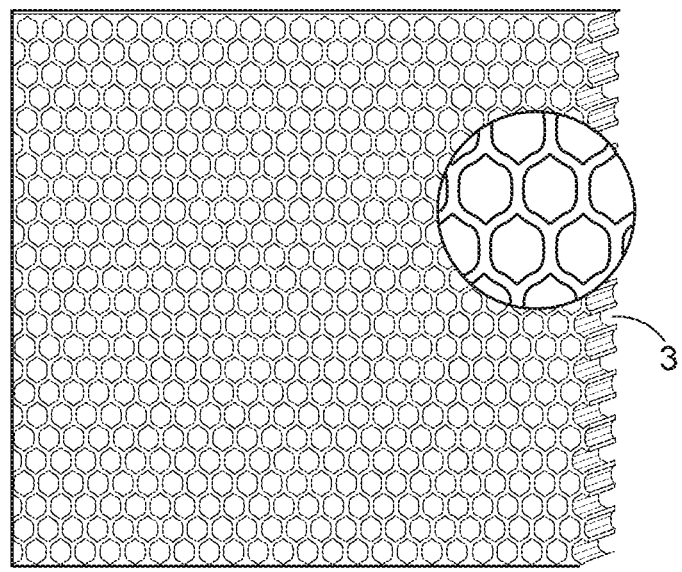
FIG. 2 shows a detailed view of the microwave trap shown in FIG. 1.

The means 3 of allowing hornets to enter the cavity are shown in FIG. 2. These means are composed of a network of honeycomb type waveguides. All or some of a wall is then composed of such a network. Preferably, the "top" wall (opposite the "bottom" wall that is placed on the ground when the trap is used) is entirely or partly formed from a network of honeycomb type guide waves. The dimensions of the waveguides are such that firstly hornets can penetrate into the cavity 2, and secondly electromagnetic waves present inside the cavity cannot escape from the cavity (cutoff frequency). The cavity with the opening means 3 behaves like a microwave oven and the frequency of the electromagnetic waves is preferably chosen to be approximately equal to 2.45 GHz.

The source S that emits electromagnetic waves inside the cavity is preferably a magnetron placed on one of the outside walls of the cavity, said wall being pierced with an orifice through which waves pass. According to another embodiment of the invention, the source S is placed inside the cavity. The source S emits waves as soon as the presence of a hornet is detected in the cavity. To achieve this, the trapping device P includes a system for detection of the presence of a hornet.

The hornet presence detection system preferably operates based on the principle of an optical barrier. To achieve this, the detection system comprises optical means that create a light strip N inside the cavity and electronic means that output a control signal capable of triggering the source S as soon as a hornet passes through the light strip N.

The optical means that create a light strip N inside the cavity comprise a set 4 of light emitting diodes and a reflector 5 placed facing the set of diodes. The diodes emit light towards the reflector 5 and the reflector 5 reflects the light that it receives to a detection circuit 6 adjacent to the diodes. The detection circuit 6 comprises a light detector, means of measuring the light quantity detected by the light detector and means of outputting the control signal as soon as the quantity of measured light is reduced by a previously established quantity, which is the case when a hornet passes through the strip N.

The control signal output by the circuit 6 triggers operation of the source S that then emits a uniform electromagnetic field in the cavity 2. The source S is preferably sized so that the temperature of the hornet is increased to 50° C. in a few seconds, and the hornet then dies and drops. One or several doors d1, d2 placed in the bottom part of the trap P then recover the corpses of dead hornets. In one particular embodiment, a system for measuring the temperature in the cavity contributes to slaving the microwave source S to adapt the power emitted by this source to the temperature inside the cavity.

According to one improvement of the invention, the microwave trap comprises a call device capable of attracting hornets inside the cavity.

It has been demonstrated that hornets are sensitive to some stimuli that attract them to a particular geographic point. For example these stimuli may be intense light or sound vibrations with an appropriate frequency or chemical bait or biological bait. This is why according to one improvement of the invention, the optical trap P also comprises a call device A capable of attracting hornets, consisting of an intense light source (for example a halogen light) and/or a sound source at the appropriate frequency and/or chemical or biological bait. The stimuli emitted by the call device are adapted to the hornets that are to be attracted, for example Asian hornets. Depending on the location of the microwave trap, the energy sources that can supply power to the electronic circuit 6 and the call device A are composed of one or several electrical batteries or the mains power supply. The call device A is preferably centred inside the cavity, for example placed on a stand 7.

In one particular embodiment of the invention, the call device A is remote controlled.

Figure 3:
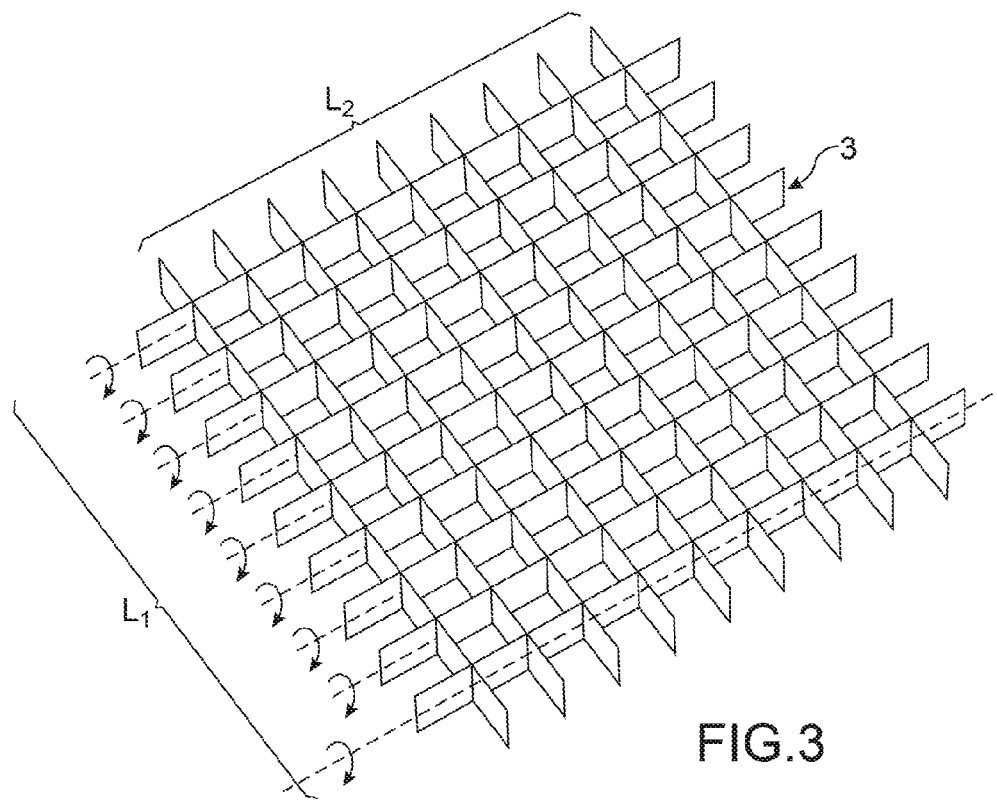
FIG. 3 shows a first embodiment of an improvement to the microwave trap according to the invention.

FIG. 3 shows a first embodiment of an improvement to the hornet trap according to the invention.

According to the improvement to the invention, the opening means that allow hornets to enter the cavity can be oriented in order to give a better distribution of the call device A towards the hornets to be trapped.

According to the first embodiment of this improvement to the invention (see FIG. 3), some walls of the waveguides of the honeycomb type waveguide network can be oriented. The waveguides are then composed for example of two sets $L_1$, $L_2$ of metal strips perpendicular to each other, the metal strips of one of the two sets being oriented by pivoting them about their axes. The strips can be oriented about their axes by any method known in itself.

Figure 4:
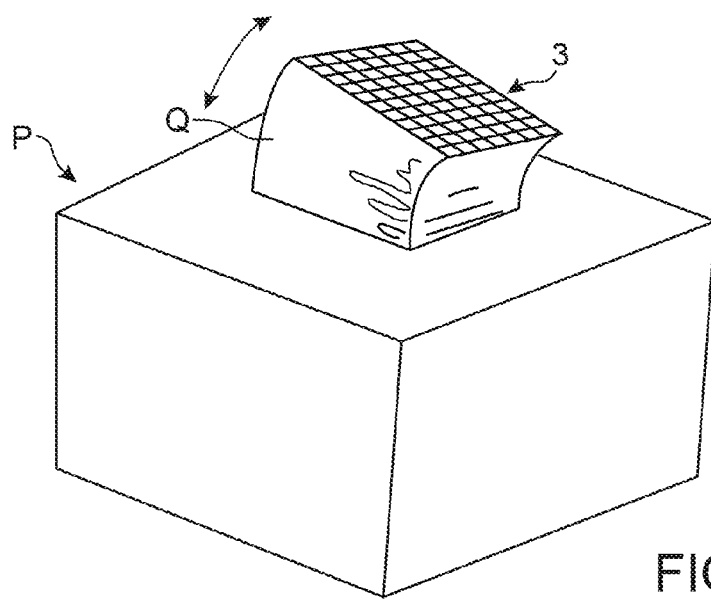
FIG. 4 shows a second embodiment of the improvement to the microwave trap according to the invention.

According to a second embodiment of this improvement to the invention (see FIG. 4), the opening means 3 through which hornets enter the cavity are located at the end of a deformable tube Q that opens up into one of the walls of the cavity. The material from which the tube Q is made is a deformable metal. In the example in FIG. 4, the straight section of the tube is rectangular. However other geometries of the straight section are quite possible, for example the straight section can be circular.

The invention claimed is:

1. Hornet trap, characterised in that it comprises:
   a metal chamber (1) that defines a cavity (2), a wall of the chamber being provided with opening means (3) through which at least one hornet can enter the cavity, the opening means (3) being sized such that electromagnetic waves with a given frequency present in the cavity cannot escape from the cavity (2),
   means (4, 5, 6) of detecting the presence of at least one hornet in the cavity (2), and
   an electromagnetic wave source (S) capable of generating electromagnetic waves at the given frequency inside the cavity (2) when a hornet is detected in the cavity.

2. Hornet trap according to claim 1, in which the opening means (3) are composed of a network of honeycomb type waveguides forming all or part of a wall of the chamber.

3. Hornet trap according to claim 1, in which the opening means can be oriented ($L_1$, $L_2$, Q).

4. Hornet trap according to claim 1, in which the cavity (2) contains call means (A) capable of attracting hornets into the cavity.

5. Hornet trap according to claim 4, in which the call means (A) comprise an intense light source and/or a sound source and/or chemical or biological bait.

6. Hornet trap according to claim 4, in which the call means (A) are Asian hornet call means.

7. Hornet trap according to claim 1, in which the means (4, 5, 6) capable of detecting the presence of at least one hornet in the cavity (2) comprise optical means that create a strip of light in the cavity and electronic means that output a control signal capable of triggering the electromagnetic wave source (S) as soon as a hornet passes through the light strip.

8. Hornet trap according to claim 1, in which the given frequency is approximately equal to 2.45 GHz.

9. Hornet trap according to claim 1, in which the electromagnetic wave source (S) is a magnetron.

\* \* \* \* \*